United States Patent [19]

Sugawara

[11] Patent Number: 5,724,353
[45] Date of Patent: Mar. 3, 1998

[54] SELF-ROUTING SWITCH METHOD AND CIRCUIT FOR AN ATM SWITCH

[75] Inventor: Tsugio Sugawara, Tokyo, Japan

[73] Assignee: NEC Corporation, Tokyo, Japan

[21] Appl. No.: 572,107

[22] Filed: Dec. 14, 1995

[30] Foreign Application Priority Data

Dec. 20, 1994 [JP] Japan .................................. 6-316214

[51] Int. Cl.$^6$ ................................................ H04L 12/28
[52] U.S. Cl. ........................... 370/395; 370/391; 370/422; 370/426
[58] Field of Search ................................. 370/230, 237, 370/391, 394, 395, 398, 399, 412, 413, 415, 422, 426, 428, 429

[56] References Cited

U.S. PATENT DOCUMENTS

| | | | |
|---|---|---|---|
| 5,157,654 | 10/1992 | Cisneros | 370/60 |
| 5,367,518 | 11/1994 | Newman | 370/54 |
| 5,390,176 | 2/1995 | Schoute et al. | 370/60.1 |
| 5,412,648 | 5/1995 | Fan | 370/60 |
| 5,550,815 | 8/1996 | Clooman et al. | 370/54 |
| 5,550,823 | 8/1996 | Irie et al. | 370/60.1 |
| 5,555,264 | 9/1996 | Sallberg et al. | 370/17 |

FOREIGN PATENT DOCUMENTS

2-87745   3/1990   Japan .
2-179141  7/1990   Japan .

*Primary Examiner*—Douglas W. Olms
*Assistant Examiner*—A. Bnmmoussa
*Attorney, Agent, or Firm*—Sughrue, Mion, Zinn, Macpeak & Seas, PLLC

[57] ABSTRACT

The object of the invention is to provide a method and a circuit for a crosspoint buffer-type self-routing switch circuit in an ATM switch that allows a switch of higher speed and greater efficiency with a more compact hardware construction and without complicated circuit configuration or operation.

In the ATM switch of the present invention, a collision of cell destination address detection section that detects and counts collisions between input cells having the same output destination and an accumulated waiting time calculation section for each output port are provided between the input lines and a crosspoint buffer section, the loss number due to collisions at the collision of cell destination address detection section and accumulated waiting time are simultaneously stored in the crosspoint buffer together with the cells, and, by making the accumulated waiting time and the loss number due to collisions between input cells accord with the waiting time upon reading out and transmitting the cells from the crosspoint buffer, sending timing that is automatically free of collisions can be achieved when reading out cells.

10 Claims, 10 Drawing Sheets

Case of A>B

Case of A>B

Case of A=B

SELF-ROUTING SWITCH METHOD AND CIRCUIT FOR AN ATM SWITCH

BACKGROUND OF THE INVENTION

1. Field of the Invention

The present invention relates to an Asynchronous Transfer Mode (ATM) self-routing switch, and particularly to a crosspoint buffer-type self-routing switch for high-speed operation.

2. Description of the Related Art

ATM switches of the prior art temporarily store cells arriving by way of an input line and transmit the cells to a prescribed output line through timely switching; the input buffer type, shared memory type, and point buffer type being put to practical use according to the construction method of the buffer. When cells are simultaneously inputted to the same output line from differing input lines, an ATM switch outputs one of the cells. The other cell is held in a buffer and then processed according to ATM switch routing to raise ATM communication efficiency.

In a crosspoint buffer-type self-routing switch of the prior art such as shown in FIG. 1, input lines 1-m of an ATM switch are each directly connected to buffer sections 301-30m corresponding to each input line, and each of the outputs from 3110-31m0 to 3m10-3mm0 of each crosspoint buffer is connected to a respective cell collector section 401-40m corresponding to target output lines 11-1m. All of the crosspoint buffers from 311-31m to 3m1-3mm have respective signal lines of cell flow regulating signal lines 3111-31m1 to 3m11-3mm1 for obtaining cell transmission rights to respective corresponding cell collector sections 401-40m, signal circuits 501-50m for mediating conflicts between signals, and buffer control sections 51-5m for controlling these signal circuits, and upon sending cells from each crosspoint buffer, a complicated exchange of signals is required between cell flow regulating signal lines from 3111-31m1 to 3m11-3mm1 and signal circuits 501-50m, and buffer control sections 51-5m that control these components.

Prior-art examples of ATM switches designed to improve communication efficiency include Japanese Patent Laid-open No. 87745/90, "Cell Contention Control Circuit" and Japanese Patent Laid-open No. 179141/90 "Switch Control System."

In Japanese Patent Laid-open No. 87745/90 "Cell Contention Control Circuit," a transmission reserved sequence corresponding to each output port is individually held in a plurality of holding registers, transmission reserved sequences are sequentially assigned to corresponding input buffers from an arbitrary holding register, and the final assignment transmission reserve sequence assigned to the last cell is returned to the holding register, a transmission loop is established that sequential update cyclically transmits the returned final assignment transmission reserve sequence as a next transmission reserve start sequence signal with respect to the holding register of the last section, and by performing transmission sequence assignment for a plurality of cells in one transmission sequence assignment process, decrease in throughput can be limited despite a large number space-division switch ports and lengthy period of transmission assignment processing for output ports.

In Japanese Patent Laid-open 179141/90 "Switch Control System," a cell storage address is stored in an input buffer and in each control buffer corresponding to a transmission destination of a cell, storage address data selected through a selection operation in output port units is supplied to a corresponding input buffer, and cells are read out. The Switch Control System eliminates unnecessary waiting time and improves communication efficiency by comparing a first reservation table corresponding to an input buffer with a second reservation table corresponding to an output port.

Both Japanese Patent Laid-open No. 87745/90 "Cell Contention Control Circuit" and Japanese Patent Laid-open No. 179141/90 "Switch Control System" relate to input buffer-type ATM switches and have a differing circuit structure than the crosspoint buffer-type ATM switch of the present invention.

In these examples of the prior art, it is difficult to limit increase in the amount of hardware or attempt designs for high-speed switch operation due to the extremely complicated circuit structure and circuit operation of the prior-art ATM switch. Furthermore, in each crosspoint buffer, cell transmission must wait until the right of cell transmission is received, and this leads to a drop in switch efficiency due to unnecessary waiting caused in cell transmission and the insertion of a necessary guard time during cell flow regulation.

SUMMARY OF THE INVENTION

The object of the present invention is to provide a self-routing switch method and circuit having a more compact hardware construction and a higher-speed and more efficient switch without complicating the circuit structure and operation of a crosspoint-type self-routing switch in an ATM switch.

The self-routing switch method for an ATM switch of the present invention is a self-routing switch method for an ATM switch for temporarily storing cells arriving by way of an input port in the order of their arrival in cell buffers at crosspoints made to correspond to output ports for each input port, reading out stored cells from these cell buffers at proper timing and outputting the cells to output ports; comprising:

a step for examining the presence or absence of collisions for the set of all simultaneously inputted cells to detect collision of output ports between simultaneously inputted cells between the input ports and these cell buffers, and when collisions exist, performing collision loss judgment, counting the loss number, and when outputting the losing cells, simultaneously outputting the counted value of the loss number of these cells;

a step for accumulating and calculating the cell waiting time inputted parallel to and simultaneous with input to the cell buffer for each output port at the time of cell input, outputting the calculation result to a buffer and simultaneously resetting the memorized value of the accumulated waiting time to "0", finding the maximum value of loss number due to collision at every output port for all inputted cells, subtracting "1" from this value and memorizing the result as the new accumulated waiting time, and subtracting "1" from the value of the stored accumulated waiting time for each fixed time interval corresponding to the transmission time of one cell until that value becomes "0";

a step for, when temporarily storing input cells in the cell buffer, storing the counted value of the loss number due to collision of these cells and the accumulated waiting time value for the output ports together with the cells in a crosspoint buffer and, when reading out cells from the crosspoint buffer, subtracting "1" from the accumulated waiting time value for each fixed time interval corresponding to the transmission time of one cell until the value becomes "0"; and a step for subtracting "1" for every fixed time interval after the accumulated waiting time value becomes "0" and until the counted value of the loss number due to collision also becomes "0", and reading out temporarily stored cells from the crosspoint buffer and transmitting the cells to output ports from the time the counted value of the loss number due to collisions becomes "0".

In addition, the self-routing circuit in an ATM switch according to the present invention is a self-routing switch circuit for an ATM switch for temporarily storing cells arriving by way of an input port in the order of their arrival in cell buffers at crosspoints corresponding to output ports for each input port, reading out the stored cells out from these cell buffers at proper timing and outputting the cells to output ports; comprising:

collision of cell destination address detection means for examining the presence or absence of collisions for the set of all simultaneously inputted cells to detect collision of output ports between simultaneously inputted cells between the input ports and these cell buffers, and when collisions exist, performing collision loss judgment, counting the loss number, and simultaneously outputting the counted value of the loss number of these cells when outputting the losing cells;

accumulated waiting time calculation means for accumulating and calculating the cell waiting time inputted parallel to and simultaneous with input to the cell buffer for each output port at the time of cell input, outputting the calculation result to the buffer and simultaneously resetting the memorized value of the accumulated waiting time to "0", finding the maximum value of loss number due to collision at every output port for all inputted cells, subtracting "1" from this value and memorizing the result as the new accumulated waiting time, and subtracting "1" from the value of the stored accumulated waiting time for each fixed time interval corresponding to the transmission time of one cell until that value becomes "0"; and buffer means including a circuit for, when temporarily storing inputted cells in the cell buffer, storing the counted value of the loss number due to collision of these cells and the accumulated waiting time value for the output ports together with the cells in a crosspoint buffer and, when reading out cells from the crosspoint buffer, subtracting "1" from the accumulated waiting time value for each fixed time interval corresponding to the transmission time of one cell until the value becomes "0"; and a circuit for similarly subtracting "1" from said counted value of the loss number due to collisions for every fixed time interval after the accumulated waiting time value becomes "0" and until the counted value of the loss number due to collision also becomes "0"; said buffer means reading out temporarily stored cells from the crosspoint buffer and transmitting the cells to output ports from the time the counted value of the loss number due to collisions becomes "0".

The collision of cell destination address detection means includes a collision of cell destination address detection section made up of a sorter circuit that arranges collision number in order of size, and an input port position reconstruction section made up of a selection circuit that operates subordinate to the sorter circuit that returns inputted cells to the input port arrival position.

The accumulated waiting time calculation means includes a distributor circuit for distributing inputted cells from each of the input ports to each corresponding output port, a sorter circuit for finding, for every output port, the maximum value of the loss number due to collisions for cells corresponding to each output port, a subtraction circuit for subtracting "1" from the maximum value of the loss number due to collision for each output port obtained by means of the sorter circuit, and a memory circuit for storing the result of the subtraction circuit, and for transmitting and storing the accumulated waiting time by means of a cell transmission timing signal.

Furthermore, the buffer means comprises: a first buffer circuit that comprises a distributor for distributing input cells according to output port for each input port; and a first crosspoint buffer including a cell buffer, a loss number buffer for storing said counted value of the loss number, an accumulated waiting time calculation buffer for storing the accumulated waiting time calculation result, a first counter for subtracting "1" from said loss number buffer, a second counter for subtracting "1" from the accumulated waiting time calculation buffer; and a cell collection circuit that collects cells for every output port and transmits cells according to a cell transmission timing signal.

In addition, the buffer means further includes a distribution circuit for distributing cells inputted from each input port according to output port; and a second buffer circuit that includes a sorter circuit for finding a maximum value of a loss number due to collision of cells corresponding to each output port for every output port, a subtraction circuit for subtracting "1" from the maximum value of the loss number due to collisions for every output port obtained by means of said sorter circuit, a memory circuit for storing the result of said subtraction circuit and transmitting accumulated waiting time according to a cell transmission timing signal, said first crosspoint buffer, and a cell collection circuit for collecting cells for every output port and transmitting cells according to a cell transmission timing signal.

Finally, the buffer means further includes a distribution circuit for distributing input cells from each input port according to output port; and a third buffer circuit that includes a sorter circuit for finding a maximum value of the loss number due to collisions of cells corresponding to each output port for every output port; a subtraction circuit for subtracting "1" from the maximum value of the loss number due to collisions for every output port obtained by means of said sorter circuit; a memory circuit for storing the result of said subtraction circuit and transmitting the accumulated waiting time according to a cell transmission timing signal; an accumulated waiting time calculation buffer for storing the accumulated waiting time calculation result; a second counter for subtracting "1" from said accumulated waiting time calculation buffer; a second crosspoint buffer including a cell buffer, a loss number buffer for storing said counted value of the loss number, and a first counter for subtracting "1" from said loss number buffer; and a cell collection circuit for collecting cells for every output port and transmitting the cells according to a cell transmission timing signal.

According to the present invention, by providing an ATM switch with both a collision of cell destination address detection section that detects and counts collisions of output destination address between input cells between the input lines of an ATM switch and a crosspoint buffer section and an accumulated waiting time calculation section for every output port, loss number due to collisions at the collision of cell destination address detection section and accumulated waiting time are simultaneously stored in a crosspoint buffer together with cells, and accumulated waiting time and loss number due to collisions between cells are made to correspond to the waiting time for the time of reading out and transmitting cells from the crosspoint buffer, thereby allowing automatic collision-free transmission timing when reading out cells.

The above and other objects, features, and advantages of the present invention will become apparent from the following description based on the accompanying drawings which illustrate an example of a preferred embodiment of the present invention.

BRIEF DESCRIPTION OF THE DRAWINGS

FIGS. 5(d) and 5(e) show the constituent elements of an input port position reconstruction section. Reference labels A and B in the figures indicate port identification, the numbers following A and B indicate the loss number of collisions, and the numbers within quotation marks indicate state signals.

DETAILED DESCRIPTION OF THE PREFERRED EMBODIMENTS

Figure 1:
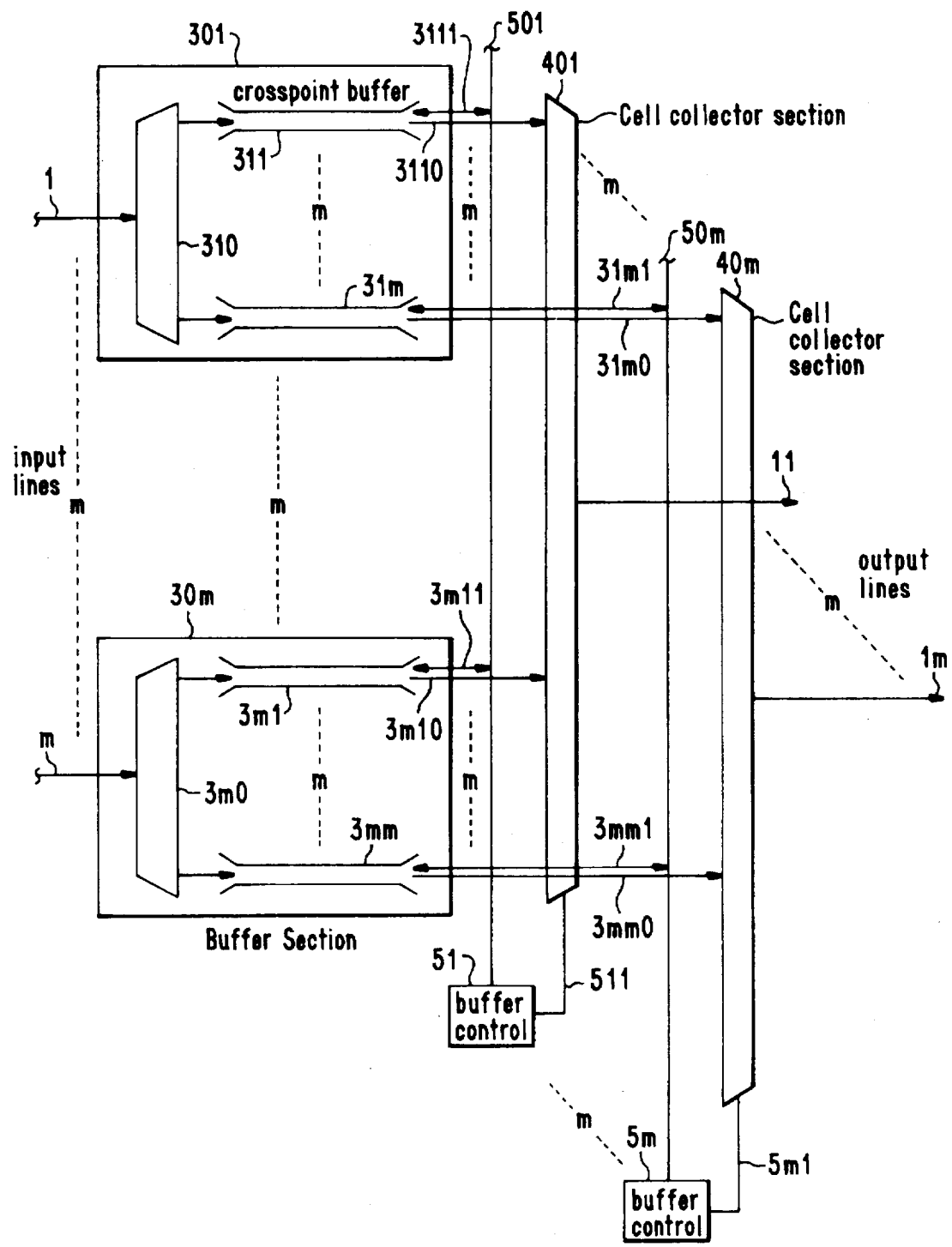
FIG. 1 is an explanatory view of a crosspoint buffer-type switch according to the prior art.
Figure 2:
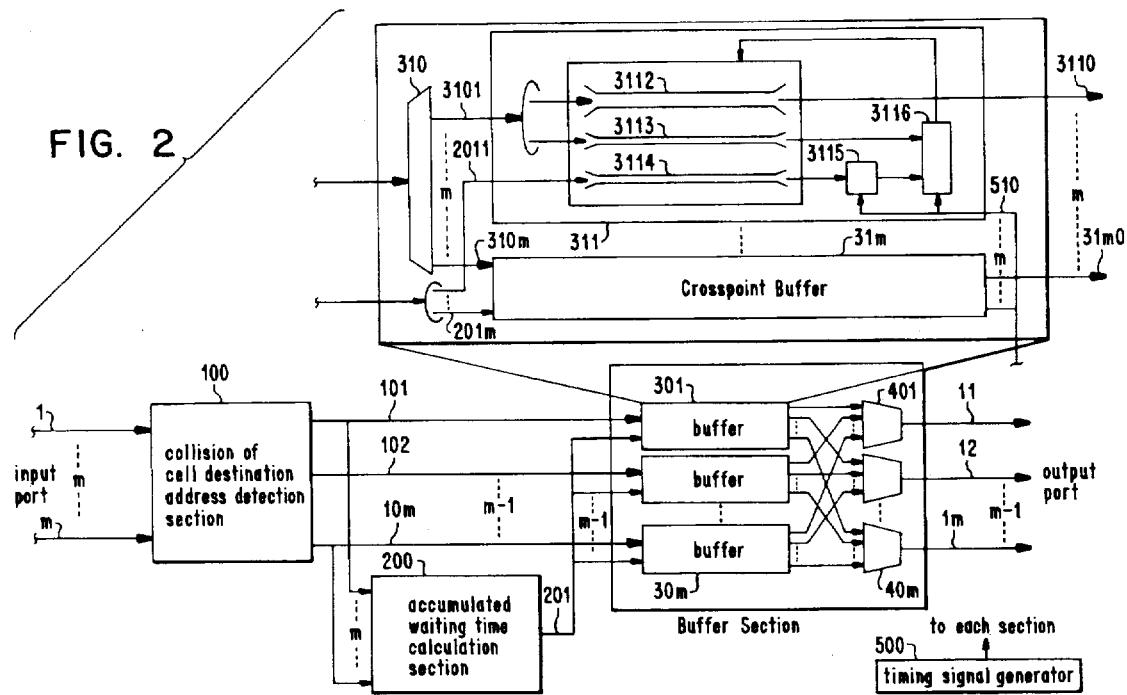
FIG. 2 is a block diagram of the first embodiment of the present invention.

The present invention will next be explained with reference to the accompanying figures. FIG. 2 is a block diagram showing an m×m switch of one embodiment of the present invention. Reference numerals 1-m indicate input ports, these input ports 1-m each being connected to collision of cell destination address detection section 100. Collision of cell destination address detection section 100 detects the collision between simultaneously inputted cells of input ports 1-m having the same output port destination, and allows the transmission of only one cell for one output port.

In order to delay the transmission of the other colliding cell as the losing cell, the collision detection section 100 counts and outputs the number of losses due to cell collisions for each cell. The output lines 101-10m of the collision of cell destination address detection section 100 correspond to one of the input ports 1-m. Each output line 101-10m is inputted to a corresponding buffer 301-30m in the buffer section, and to accumulated waiting time calculation section 200. Accumulated waiting time calculation section 200 retraces input cells back from the present time and calculates on accumulated waiting time for each of the output ports 11-1m based on the cell collision losses for each of the output ports. In addition, the accumulated waiting time calculation section 200 recalculates the value of the accumulated waiting time for each output port 11-1m and stores the value of the accumulated waiting time for each output port 11-1m. The output 201 of accumulated waiting time calculation section 200 is also inputted to each of the buffers 301-30m, together with the output 101-10m of collision of cell destination address detection section 100. As shown in FIG. 2, the output of buffers 301-30m is outputted through outputs 3110-31m0, each of which corresponds to an output port 11-1m of the buffer section. The outputs of the buffers are inputted to cell collection circuits 401-40m, each of which corresponds to an output port 11-1m. The output of each cell collection circuit 401-40m is sent to the output port 11-1m of the ATM switch.

A representative interior block composition of buffers 301-30m in FIG. 2 is shown by the interior block composition of buffer 301 which corresponds to input port 1. Distribution circuit 310 distributes the inputted cells and the loss number information from collision of cell destination address detection section 100 to crosspoint buffers 311-31m. The crosspoint buffers 311-31m each correspond to an output port 11-1m. The distribution circuit 310 outputs to outputs 3101-310m corresponding to each output port 11-1m. Finally, crosspoint buffers 311-31m also output cells to outputs 3110-31m0 corresponding to output ports 11-1m. Each crosspoint buffer 311-31m is also connected to the output 201 of accumulated waiting time calculation section 200 and inputs the accumulated waiting time 2011-201m corresponding to each output port 11-1m.

In the crosspoint buffer 311 shown in FIG. 2, input cells are stored in buffer 3112, loss number information due to collisions between input cells is stored in buffer 3113, and accumulated waiting time is stored in buffer 3114. When reading out cells stored in crosspoint buffer 311, the content of accumulated waiting time buffer 3114 is first read out and stored in counter circuit 3115, and the content of collision loss number buffer 3113 is read out and stored in counter circuit 3116. In accordance with a cell transmission timing signal 510 supplied to switches in common by timing signal generator 500, counter circuit 3115 counts "−1" from the value read from accumulated waiting time buffer 3114 for each one-cell transmission until the value becomes "0". When counter circuit 3115 detects "0", it releases the operation halt of counter circuit 3116 which stores collision loss number information. Counter circuit 3116 then continues counting "−1" from the value read from collision loss number buffer 3113 for each one-cell transmission according to transmission timing signal 510 until the value becomes "0", and when the counter circuit 3116 detects that the value of counter circuit 3116 has become "0", it reads out the cells stored in buffer 3112 and outputs to output 3110. Furthermore, when the stored data read out from the buffers is "0", counter circuit 3115 and counter circuit 3116 both judge that "0" has been detected and immediately read out cells stored in buffer 3112 to output 3110.

According to the present invention, collision will not occur between cells at the input of each of cell collection circuits 401-40m because for cells that can be outputted at the same timing to a particular output port, only one crosspoint buffer of all crosspoint buffers connected to that port is automatically selected. Accordingly, cell collection circuits 401-40m are composed of simple effective cell multiplex circuits or effective cell selection circuits.

Figure 3:
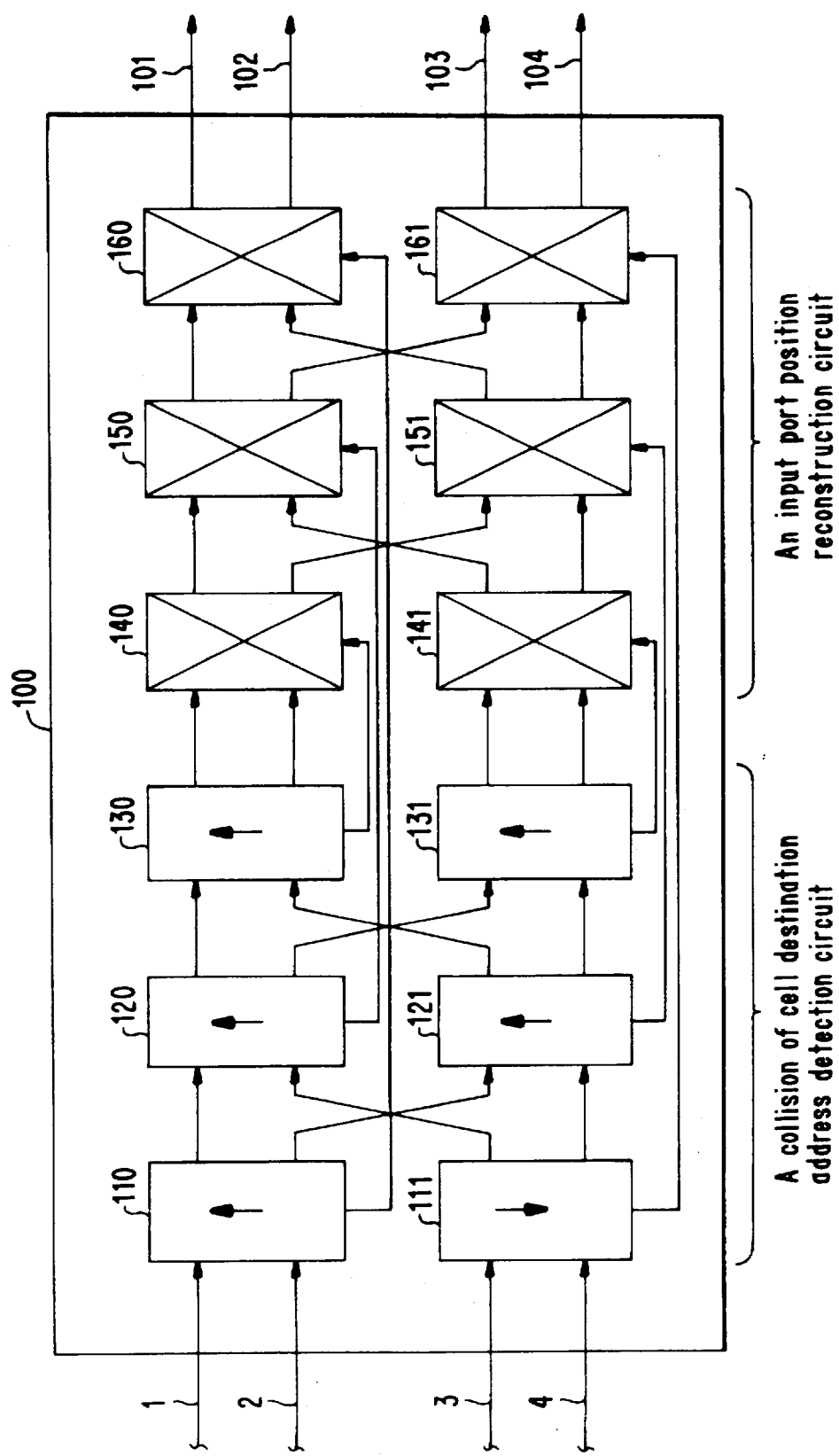
FIG. 3 is a block diagram of the interior of the collision of cell destination address detection section (for a case with four input ports) of the embodiment shown in FIG. 2.

The interior block composition of collision of cell destination address detection section 100 is shown in FIG. 3. Although FIG. 3 shows a case for four inputs, the basic configuration is not affected by an increase in inputs. Collision of cell destination address detection section 100 is made up of two portions: a collision of cell destination address detection circuit and an input port position reconstruction circuit. The collision of cell destination address detection circuit of this embodiment takes a batcher-type sorter circuit as a prototype. The collision of cell destination address detection circuit detects the presence or absence of collision to the same output port in all combinations among input ports, and simultaneously, counts the number of losses due to collisions for each cell, and outputs while adding in cell units. Because the batcher-type collision of cell destination address detection circuit operates as a sorter, the cell output port and input port do not agree, and the input port position reconstruction circuit therefore functions to return these to original state. The input port position reconstruction circuit in the case of the embodiment of FIG. 3 operates subordinate to the batcher-type collision of cell destination address detection circuit and as a result, requires operation signals. The batcher-type collision of cell destination address detection circuit therefore continues to send its own status signals to the input port position reconstruction circuit while transmitting the cells. As shown in FIG. 3, the relation of the connection correspondence between the batcher-type collision of cell destination address detection circuit of the status signals and the input port position reconstruction circuit is a position connection relation such that the row number of a batcher collision of cell destination address detection circuit counting from the input side equals the row number of an input port position reconstruction circuit counting from the output side. In the case of FIG. 3, 11x (x is 0 or 1) of the batcher-type collision of cell destination address detection circuit and 16x of the input port position reconstruction circuit, 12x of the batcher-type collision of cell destination address detection circuit and 15x of the input port position reconstruction circuit, and 13x of the batcher-type collision of cell destination address detection circuit and 14x of the input port position reconstruction circuit are mutually connected.

Figure 5A:
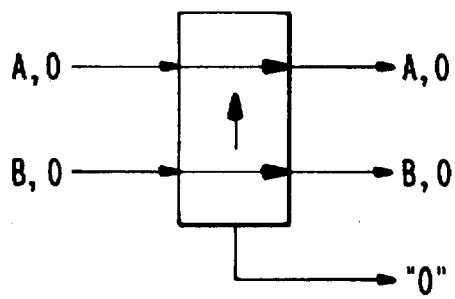
FIGS. 5(a) to 5(e) illustrate the operation of the constituent elements of the collision of cell destination address detection section shown in FIG. 3, FIGS. 5(a) to 5(c) being constituent elements of a batcher-type collision of cell destination address detection section, and the arrows showing the direction of the sorter.
Figure 5B:
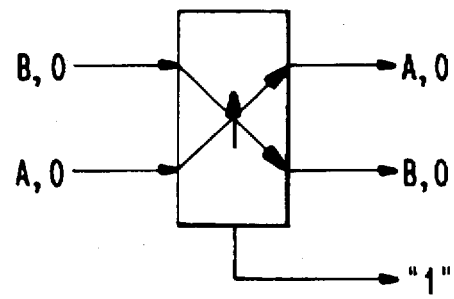
Figure 5C:
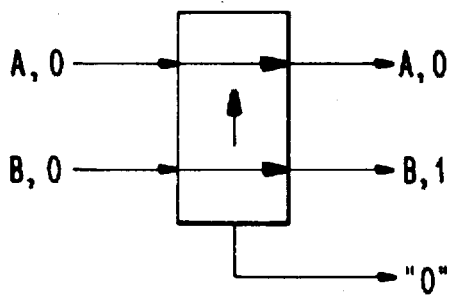
Figure 5D:
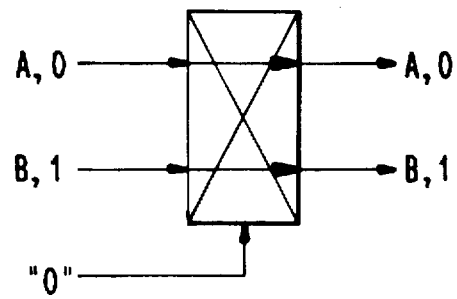
Figure 5E:
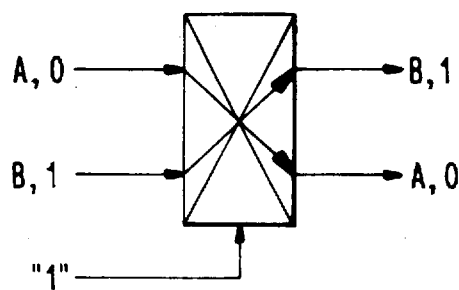
Figure 6:
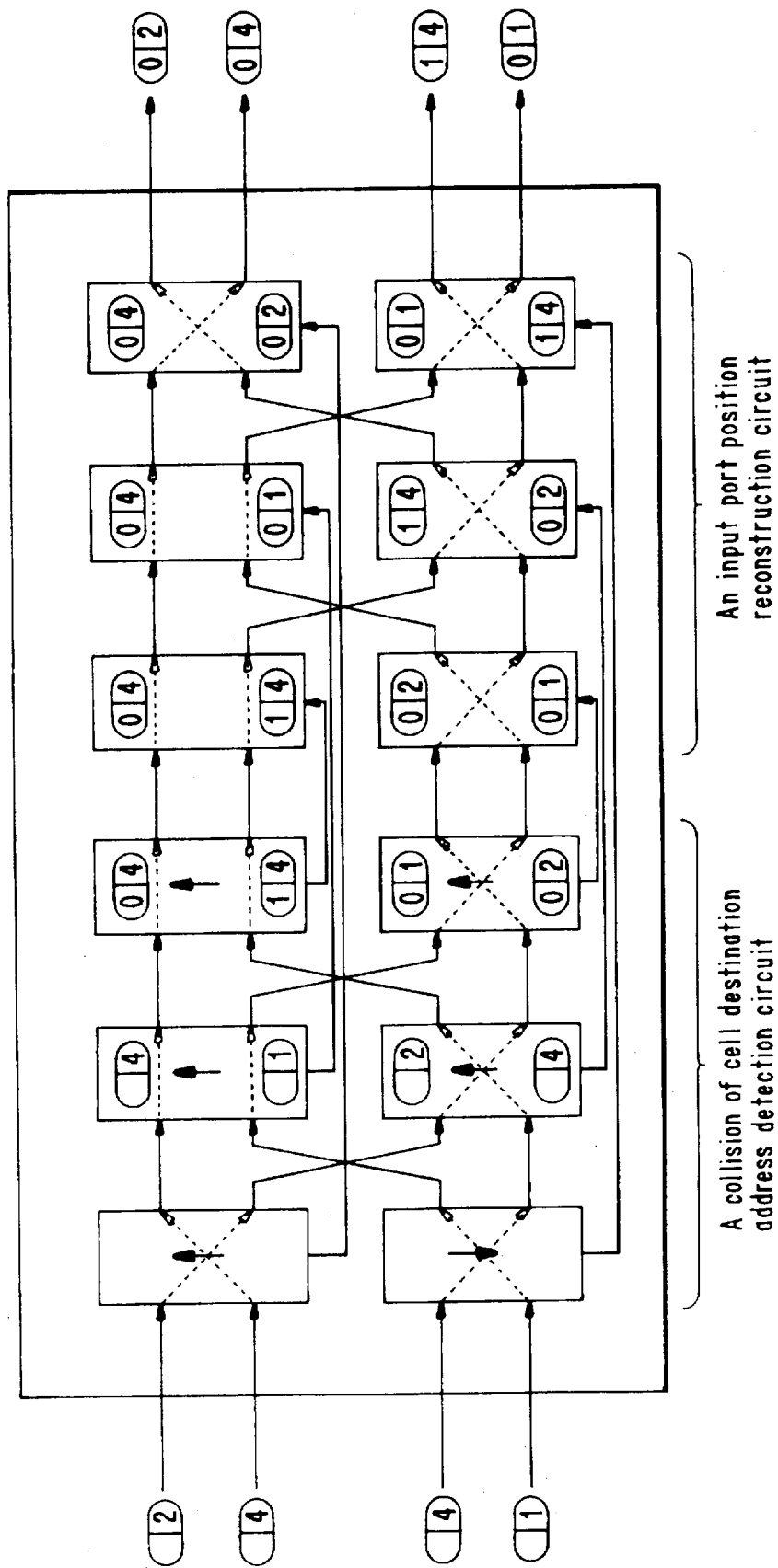
FIG. 6 is a view illustrating the operation of the collision of cell destination address detection section (for a case with four input ports) shown in FIG. 3. Of the encircled numbers, figures on the right indicate destination and those on the left indicate the loss number value due to collisions with cells having the same destination.

FIGS. 5(a) to 5(e) illustrate the operation of the constituent elements of the collision of cell destination address detection section shown in FIG. 3. FIGS. 5(a) to 5(c) showing constituent elements of a batcher-type collision of cell destination address detection section, and the arrows showing the sorter direction of the sorter circuits. FIG. 5(d) and FIG. 5(e) show the constituent elements of the input port position reconstruction section. Reference labels A and B in the figures indicate port identification, the numbers following A and B indicate the loss number of collisions, and the numbers within quotation marks indicate state signals. In addition, FIG. 6 shows the state of operation of cell input by the collision of cell destination address detection section.

Figure 4:
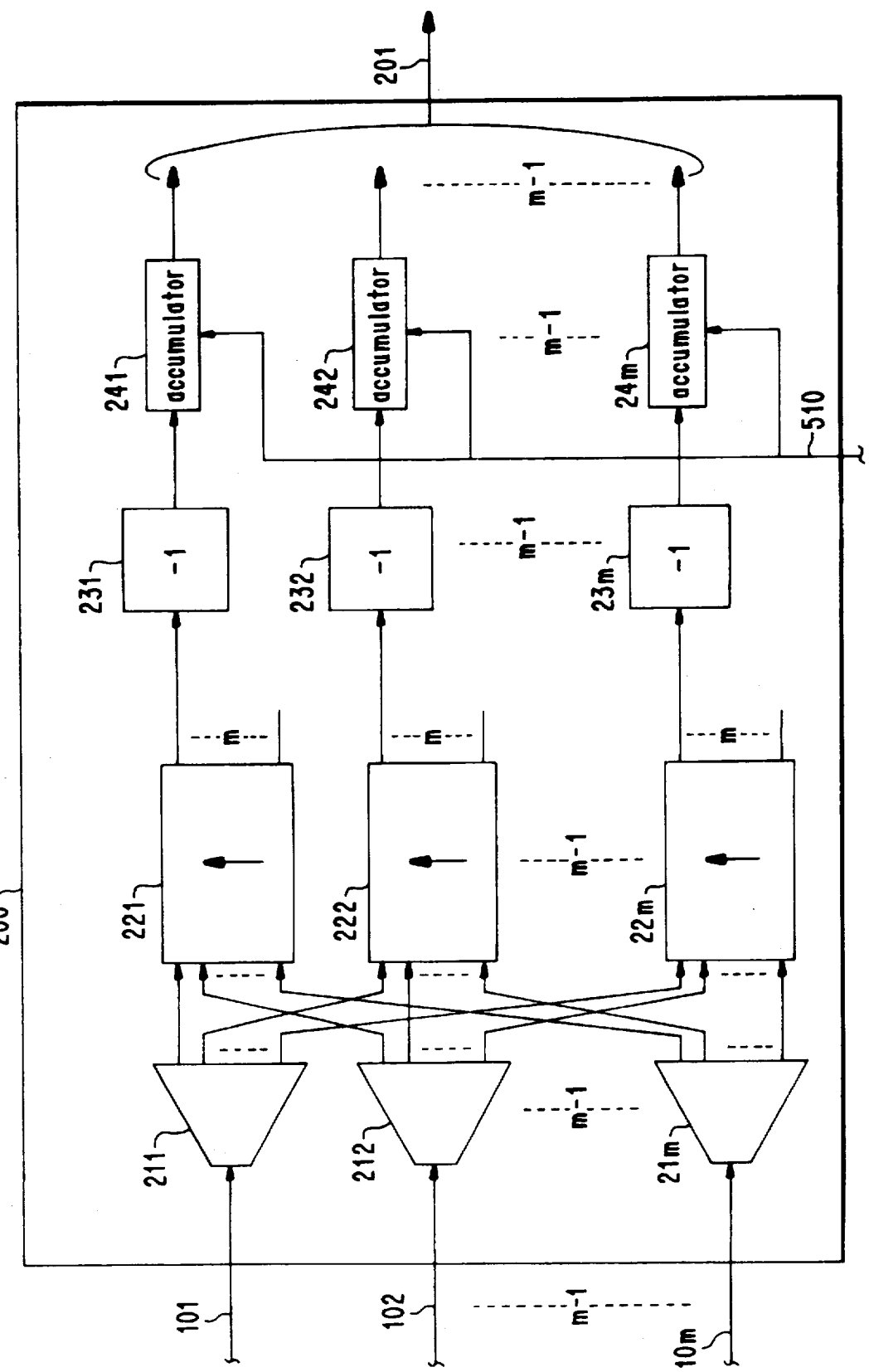
FIG. 4 is a block diagram of the interior of the accumulated waiting time calculation section of the embodiment shown in FIG. 2.

The interior block composition of accumulated waiting time calculation section 200 is shown in FIG. 4. In FIG. 4, reference numerals 101, 102-10m indicated input ports; 211, 212-21m indicate distribution circuits corresponding to output ports 11, 12-1m of input cells from each of input ports 101, 102-10m, respectively; reference numerals 221, 222-22m each indicate sorter circuits for finding the maximum value of the loss number due to collision for each output port of cells corresponding to each output port 11, 12-1m; reference numerals 231, 232-23m indicate subtraction circuits that count "−1" from the maximum value of the loss number due to collision for each output port obtained at 221, 222-22m; reference numerals 241, 242-24m are circuits for storing the results from the subtraction circuit 231, 232-23m, outputting the stored values of the accumulated waiting time to output 201 upon cell input, simultaneously resetting the outputted memorized value to "0", and if each output of 231, 232-23m are effective, storing output corresponding to each as a new accumulated waiting time corresponding to each output port. In addition, in accordance with cell transmission timing signal 510 supplied to switches from timing signal generator section 500, the value of the accumulated waiting time corresponding to each output port stored in 241, 242-24m is automatically counted down by "−1" for every one-cell transmission until the value becomes "0".

Figure 7:
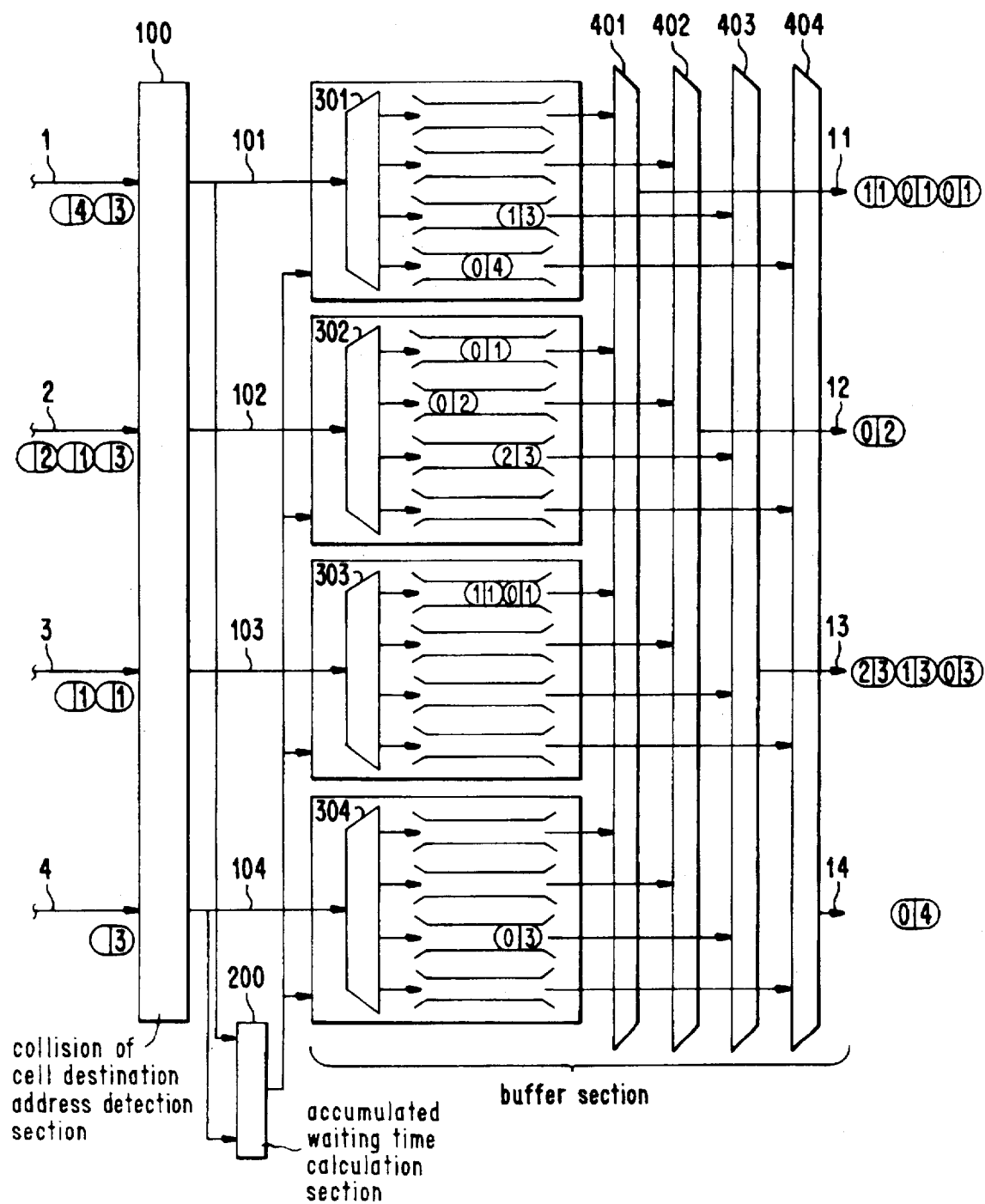
FIG. 7 is a view illustrating the operation of the embodiment shown in FIG. 2 for a case having 4×4 switches, the cell collision loss value (the encircled figures on the left indicate the value and the figures on the right indicate output port number) does not actually appear in the output. In addition, this example shows a case in which the accumulated waiting time is 0, and the time relation between each cell is indicated by the buffer content and line position.
Figure 8A:
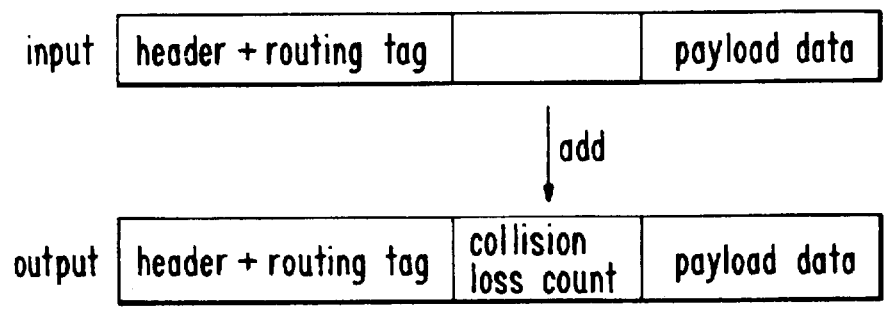
FIGS. 8(a) to 8(c) illustrate input/output information format for each section of the embodiment shown in FIG. 2, FIG. 8(a) showing the collision of cell destination address detection section, 8(b) showing the accumulated waiting time calculation section, and FIG. 8(c) showing the buffer section.
Figure 8B:
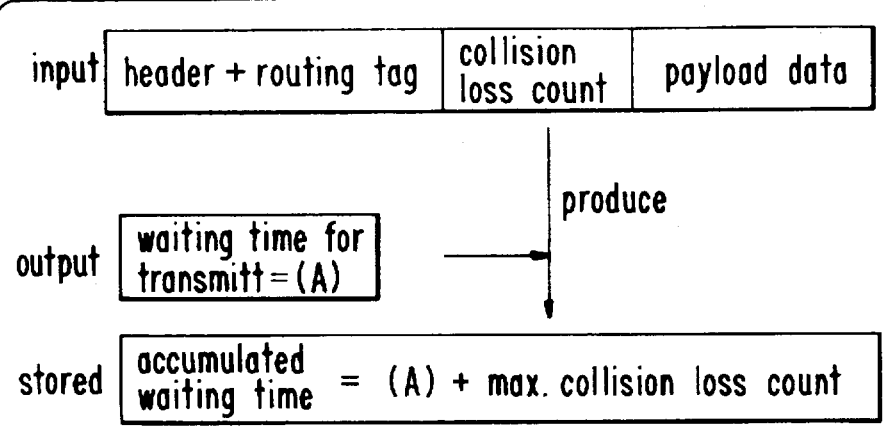
Figure 8C:
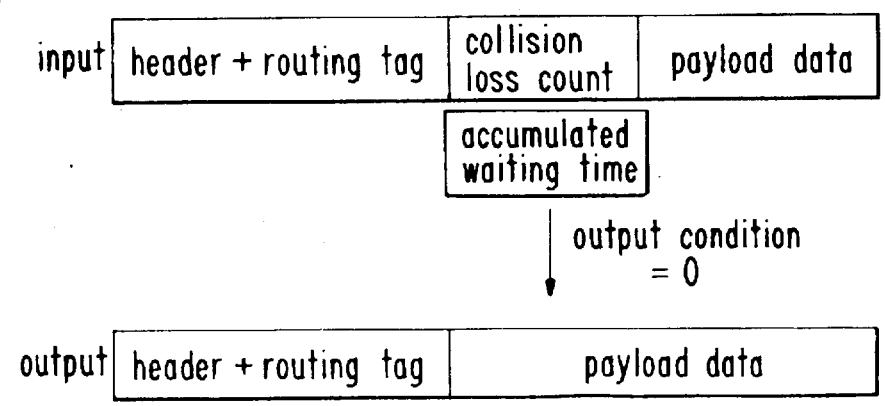

The mode of actual operation of present invention as described hereinabove with a 4×4 switch is shown in FIG. 7, while FIGS. 8(a)–8(c) show input/output information in collision of cell destination address detection section 100, accumulated waiting time calculation section 200, and each portion of the buffer section. FIGS. 8(a), 8(b), and 8(c) show the input/output information format for the collision of cell destination address detection section, the accumulated waiting time calculation section, and the buffer section, respectively. For the purpose of easy comprehension, FIG. 7 is drawn with collision loss number value corresponding to output cells, but the collision loss number value is not actually outputted from the ATM switch.

Figure 9:
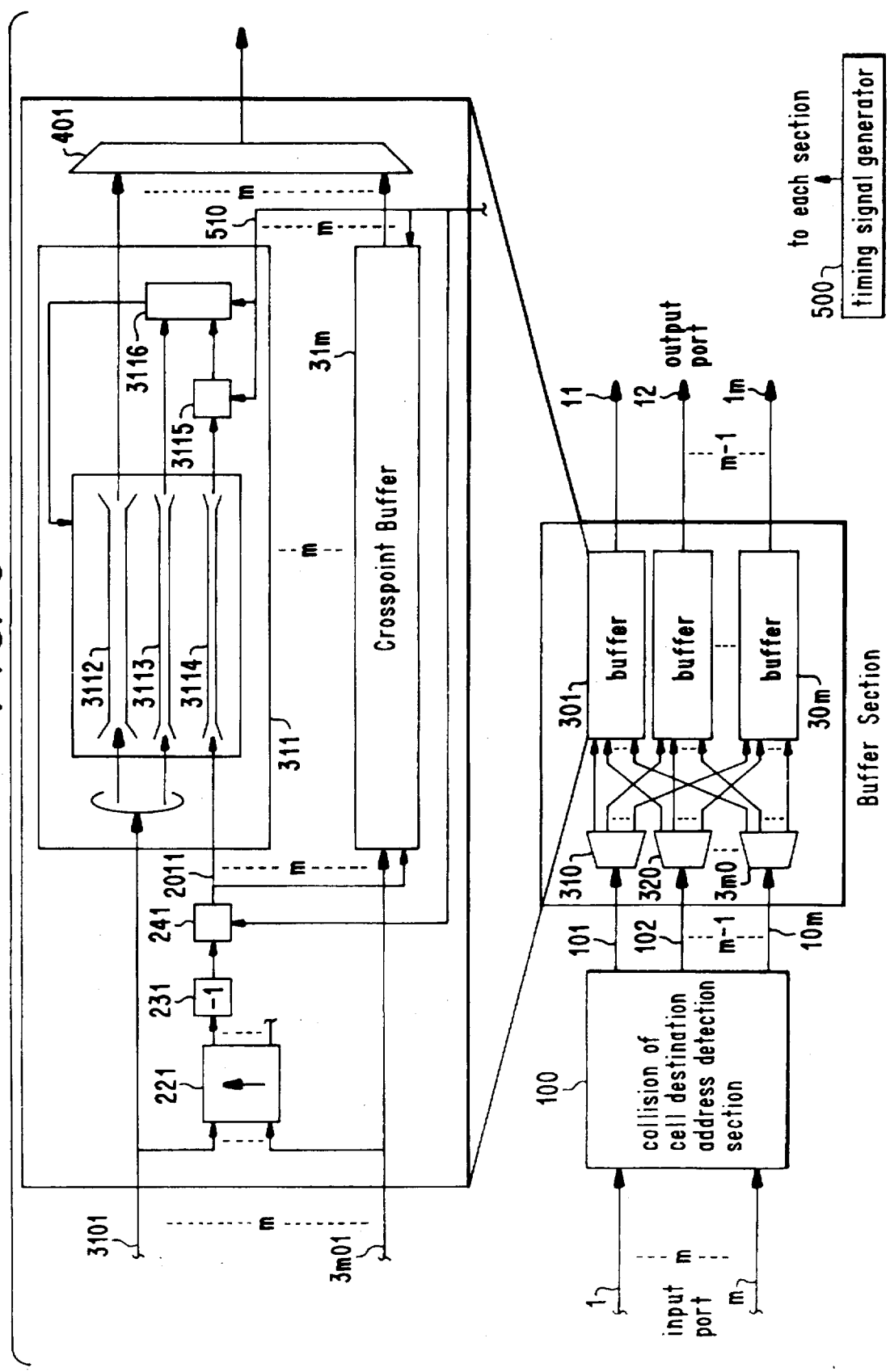
FIG. 9 is a block diagram of the second embodiment of the present invention.

Another embodiment of the present invention will next be explained. FIG. 9 is a block diagram of an m×m switch showing the second embodiment of the present invention. In this embodiment, the construction of the buffer section of the first embodiment shown in FIG. 2 has been modified such that buffers 301-30m of the buffer section in the embodiment of FIG. 9 correspond to output ports, in contrast to the embodiment of FIG. 2 in which buffers 301-30m of the buffer section correspond to input ports. The functions and operation of the second embodiment are otherwise completely equivalent to those of the first embodiment. Although components bearing the same reference numerals in FIGS. 2 and 9 are completely equivalent in function, the functions of the accumulated waiting time calculation section 200 in the embodiment of FIG. 9 are dispersed and contained among the buffers 301-30m of each buffer section, and the embodiment of FIG. 9 therefore features less hardware than the embodiment of FIG. 2.

Figure 10:
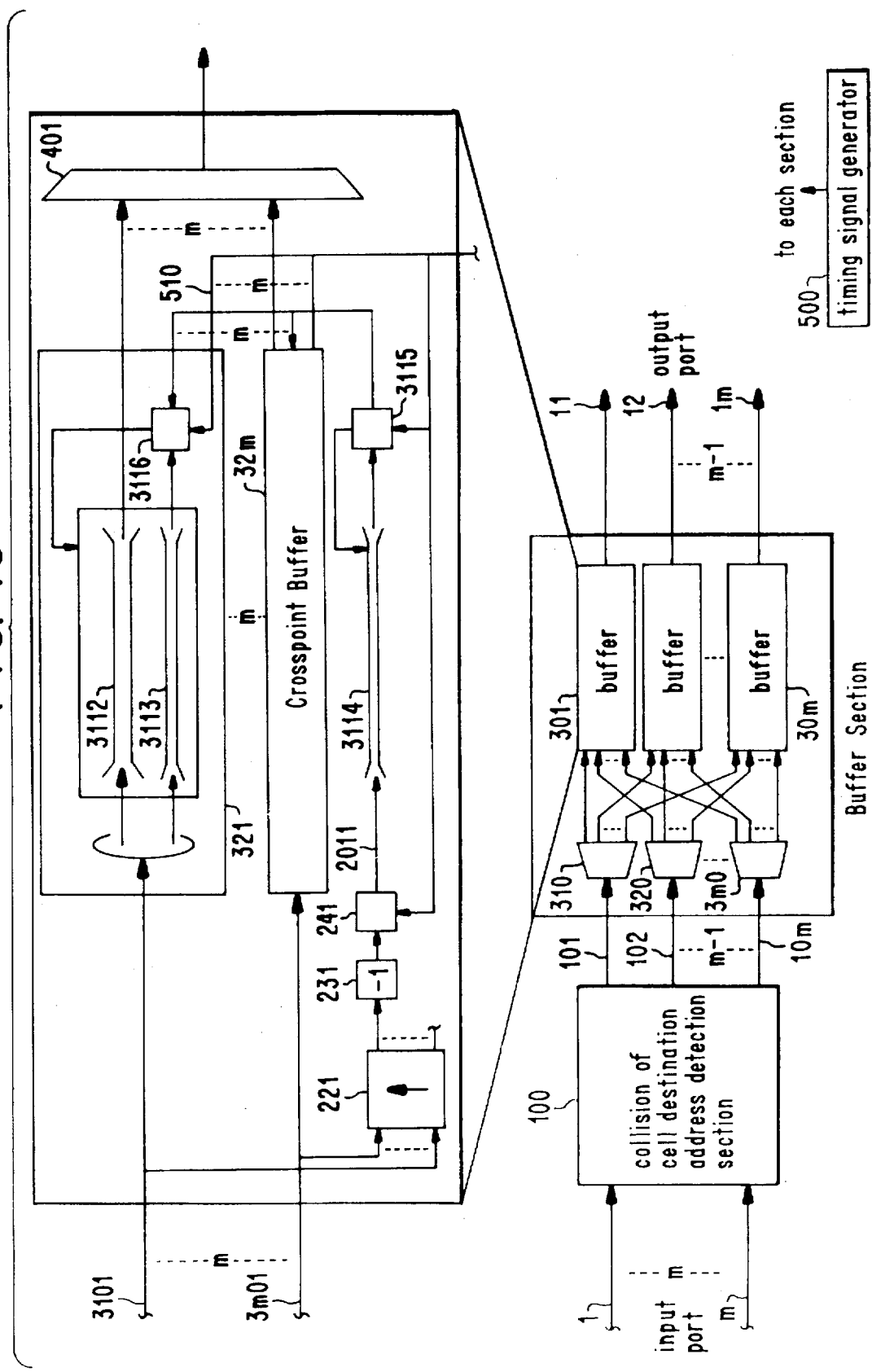
FIG. 10 is a block diagram showing the third embodiment of the present invention.

FIG. 10 is a block diagram of an m×m switch showing the third embodiment of the present invention having a buffer section constructed based on the same concept as that of the embodiment of FIG. 9. As with the embodiment of FIG. 9, the functions and operation of this embodiment are entirely equivalent to those of the embodiment of FIG. 2; however, while each crosspoint buffer within each buffer 301-30m of the buffer section holds an accumulated waiting time buffer 3114 within buffers 301-30m of the buffer section in the embodiment of FIG. 9, the embodiment of FIG. 10 is more efficiently constructed to eliminate redundant storage of identical information and has one accumulated waiting time buffer 3114 within buffers 301-30m of each buffer section, and the embodiment of FIG. 10 thus has even less hardware than the embodiment of FIG. 9.

As described hereinabove, by storing loss number due to collision at a collision of cell destination address detection section in a crosspoint buffer simultaneously with an input cell and making the number of losses due to collision between cells correspond to the waiting time when reading out and transmitting cells from a crosspoint buffer, the present invention allows automatic collision-free transmission timing when reading cells, and therefore has the effect of allowing higher speed, greater efficiency as well as a more compact hardware construction without complicated switch circuit configuration or operation.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A self-routing switch method for an ATM switch that temporarily stores cells arriving by way of an input port in the order of their arrival in cell buffers comprising:

a step for detecting collisions of output port addresses in a set of cells simultaneously inputted to the input ports of said ATM switch, and when collisions are detected, performing collision loss judgment, counting a cell loss number which indicates the number of cell losses due to said collisions, and when outputting losing cells, simultaneously outputting the counted cell loss number;

a step for calculating an accumulated cell waiting time and inputting said accumulated waiting time parallel to and simultaneous with cells input to a plurality of cell buffers, each of said cell buffers corresponding to an output port, outputting the accumulated cell waiting time to a corresponding buffer and simultaneously resetting a stored value of the accumulated waiting time to "0", finding a maximum value of cell loss number for each output port, subtracting "1" from the maximum value of cell loss number for each output port and storing said maximum value as the accumulated waiting time, and subtracting "1" from the stored accumulated waiting time for each fixed time interval corresponding to a one cell transmission time until the stored new accumulated waiting time becomes "0";

a step for, when temporarily storing input cells in the cell buffer; storing the cell loss number, the accumulated waiting time and the cells in a crosspoint buffer; and when reading out cells from the crosspoint buffer, subtracting "1" from the stored accumulated waiting time for each fixed time interval corresponding to the one cell transmission time until the the accumulated waiting time becomes "0"; and a step for subtracting "1" for each fixed time interval after the accumulated waiting time value becomes "0" until the cell loss number also becomes "0", and reading out the temporarily stored input cells from the crosspoint buffer and transmitting the input cells to output ports from the time the cell loss number becomes "0".

2. A self-routing switch circuit for an ATM switch wherein said circuit temporarily stores cells arriving by way of an input port in the order of their arrival in cell buffers comprising:

collision of cell destination address detection means for detecting collisions of output port addresses in a set of cells simultaneously inputted to input ports of said ATM switch and, and for performing collision loss judgment when collisions are detected and counting a cell loss number which indicates a number of cell losses due to said collisions, and for simultaneously outputting the counted cell loss number;

accumulated waiting time calculation means for calculating an accumulated cell waiting time and inputting said accumulated cell waiting time in parallel to and simultaneous with cells input to a plurality of cell buffers each of said plurality of cell buffers corresponding to an output port, outputting the accumulated cell waiting time to a corresponding buffer and simultaneously resetting a stored value of the accumulated waiting time to "0", finding a maximum value of cell loss number for each output port, subtracting "1" from the maximum value of cell loss number and storing said maximum value as the accumulated waiting time, and subtracting "1" from the value of the stored accumulated waiting time for each fixed time interval corresponding to a one cell transmission time until the stored accumulated waiting time becomes "0"; and buffer means including a circuit for, when temporarily storing inputted cells in said cell buffer, storing the cell loss number due to collision of said cells and the accumulated waiting time and said input cells in a crosspoint buffer; and when reading out said input cells from said crosspoint buffer, subtracting "1" from said accumulated waiting time for each fixed time interval corresponding to the one cell transmission time until the accumulated waiting time becomes "0"; and a circuit for subtracting "1" from said cell loss number for each fixed time interval after the accumulated waiting time value becomes "0" and until the cell loss number also becomes "0"; said buffer means reading out temporarily stored input cells from the crosspoint buffer and transmitting the input cells to output ports from the time the cell loss number due to collisions becomes "0".

3. A self-routing switch circuit from an ATM switch according to claim 2 wherein said collision of cell destination address detection means includes a collision of cell destination address detection section having a sorter circuit for arranging a plurality losing cells in order of size, and an input port position reconstruction section made up of a selection circuit that operates subordinate to said sorter circuit and that returns inputted cells to the input port arrival position.

4. A self-routing switch circuit in an ATM switch according to claim 2 wherein said accumulated waiting time calculation means comprises:

a distributor circuit for distributing inputted cells from each of the input ports to an output port;

a sorter circuit for finding the maximum value of the loss number for each output port;

a subtraction circuit for subtracting "1" from the maximum value of the cell loss number for each output port obtained by means of said sorter circuit; and a memory circuit for storing the result of said subtraction circuit, and for transmitting and storing the accumulated waiting time according to a cell transmission timing signal.

5. A self-routing switch circuit in an ATM switch according to claim 2 wherein said buffer means comprises:

a first buffer circuit having a distributor for distributing input cells according to output port for each input port; and a first crosspoint buffer including a cell buffer, a cell loss number buffer, an accumulated waiting time buffer, a first counter for subtracting "1" from said loss number buffer, and a second counter for subtracting "1" from the accumulated waiting time buffer; and a cell collection circuit that collects cells for every output port and transmits cells according to a cell transmission timing signal.

6. A self-routing switch circuit in an ATM switch according to claim 5 wherein said buffer means further comprises:

a second buffer circuit having a sorter circuit for finding a maximum value of the cell loss number corresponding to each output port, a subtraction circuit for subtracting "1" from the maximum value of the cell loss number obtained by means of said sorter circuit, a memory circuit for storing a result of said subtraction circuit and for transmitting the accumulated waiting time in accordance with a cell transmission timing signal.

7. A self-routing switch circuit in an ATM switch according to claim 6 wherein said switch circuit includes a plurality of said second buffers.

8. A self-routing switch circuit in an ATM switch according to claim 5 wherein said switch circuit includes a plurality of said first buffers.

9. A self-routing switch method for an ATM switch that temporarily stores input cells in cell buffers and reads out the stored input cells from said cell buffers at proper timing comprising:

detecting collision between input cells having the same output port destination address;

determining a cell loss number which indicates a number of input cells having the same output port destination address;

calculating and storing a cell waiting time for an input cell;

simultaneously inputting an input cell, a corresponding cell loss number and the cell waiting time to one of said cell buffers and simultaneously resetting the stored cell waiting time to "0";

finding a maximum cell loss number for all inputted cells, subtracting "1" from the maximum cell loss number and storing the maximum cell loss number as the cell waiting time, and subtracting "1" from the stored cell waiting time for a time interval corresponding to a one cell transmission time until that value becomes "0"; and storing the cell loss number, the cell waiting time, and the input cells in a crosspoint buffer and, when reading out cells from the crosspoint buffer, subtracting "1" from the cell waiting time value until the cell waiting time becomes "0"; and subtracting "1" for each time interval corresponding to the one cell transmission time after the cell waiting time value is "0" until the loss cell number also becomes "0", and reading out temporarily stored input cells from the crosspoint buffer and transmitting the cells to output ports from the time the cell loss number becomes "0".

10. A self-routing switch circuit for an ATM switch comprising:

collision of cell destination address detection means for detecting collision between input cells having the same output port destination and for determining a cell loss number which indicates a number of input cells having the same output port destination address;

waiting time calculation means for calculating and storing a cell waiting time for an input cell;

a plurality of cell buffers, each cell buffer receiving and storing an input cell, a corresponding cell loss number and the cell waiting time wherein said cell waiting time stored in the waiting time calculation means is reset to "0" when one of said buffers receives said input cell;

a first counter for decrementing "1" from the cell waiting time for each time interval for transmitting one cell until the value of the cell waiting time is "0";

a second counter for decrementing "1" from a maximum cell loss number to provide a new cell waiting time and for subtracting "1" from the new cell waiting time for each time interval for transmitting one cell after the cell waiting time is "0" and until the new cell waiting time is "0";

said plurality of buffers reading out the stored input cells when the cell waiting time is "0" until the new cell waiting time is "0".

* * * * *